US006795213B1

(12) United States Patent
Hanyu

(10) Patent No.: US 6,795,213 B1
(45) Date of Patent: Sep. 21, 2004

(54) PRINTER WITH A TONALITY CORRECTION CAPABILITY

(75) Inventor: Hitomi Hanyu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/558,146

(22) Filed: Apr. 26, 2000

(30) Foreign Application Priority Data

Apr. 26, 1999 (JP) ........................................ 11-117799

(51) Int. Cl.$^7$ ............................ G06K 9/40; G06K 9/00

(52) U.S. Cl. ........................ 358/1.9; 382/254; 382/162; 382/274

(58) Field of Search ........................... 345/604; 358/1.9, 358/1.16, 1.6, 1.18, 406, 447, 504, 518, 520, 527, 3.27; 382/162, 254, 274

(56) References Cited

U.S. PATENT DOCUMENTS 5,271,096 A * 12/1993 Cook ........................ 345/604
6,606,395 B1 * 8/2003 Rasmussen et al. ........ 382/112

* cited by examiner

*Primary Examiner*—Kimberly Williams
*Assistant Examiner*—Thomas J Lett
(74) *Attorney, Agent, or Firm*—Oblon, Spivak, McClelland, Maier & Neustadt, P.C.

(57) ABSTRACT

A printer with a tonality correction capability includes test pattern forming means for forming a particular test pattern for each tonality processing method. Image reading means reads the test pattern formed by the test pattern forming means. The test pattern read is compared with data representative of a target pattern to thereby execute tonality correction matching with a tonality processing method to be used. The printer obviates manual operation needing expertness and allows even the user of the printer to correct the variation of tonality ascribable to a difference in the type of a printer and aging.

9 Claims, 7 Drawing Sheets

FIG. 6

| | | | | |
|---|---|---|---|---|
| TARGET 1 | DATA 1 | DATA 2 | DATA 3 | .... |
| TARGET 2 | DATA 1' | DATA 2' | DATA 3' | .... |
| TARGET 3 | DATA 1" | DATA 2" | DATA 3" | .... |
| .... | .... | .... | .... | .... |

PRINTER WITH A TONALITY CORRECTION CAPABILITY

BACKGROUND OF THE INVENTION

The present invention relates to a printer with a tonality correction capability and more particularly to a printer with a tonality correction capability and allowing even the user of the printer to adjust the variation of tonality ascribable to a difference in the type of the printer and aging.

A printer, particularly a copier, with a semiautomatic tonality correction capability, i.e., a method and an apparatus for printing a test pattern on a recording medium, reading it with a scanner, and automatically adjusting tonality to a target has been proposed in the past. Japanese Patent Laid-Open Publication No. 5-114962, for example, discloses a printer storing a test pattern and reading an image pattern based on the test pattern with image reading means thereof. Data listed in an image signal conversion table are corrected in accordance with the image pattern read by the image reading means, so that quality image can be stably output even when the output variation characteristic varies due to, e.g., the deterioration of image forming means. Japanese Patent Laid-Open Publication No. 9-107478 teaches a printer capable of correcting a signal representative of a pattern formed on a recording medium with data representative of the background of the medium. This printer copes with an occurrence that the output value of a scanner or similar image reading device varies. Further, Japanese Patent Laid-Open Publication No. 9-23340 proposes an image reading device capable of compressing image data existing on the rear of a document by using a method different from a method for compressing image data existing on the front of the same document.

None of the above conventional schemes, however, takes account of a plurality of tonality processing methods customary with a printer and selectively used in accordance with a memory capacity, among others. As a result, even if tonality is corrected without an output device executing tonality processing, i.e., only by the print tonality ability of the engine, high density portions included in an output undergone tonality processing are often smeared out. More specifically, when tonality processing is not executed, tonality is rendered by a single dot sequentially increasing in size or in density and adjusted to a target in such a manner as to continuously vary. However, when tonality is rendered by, e.g., dither processing after the above dot adjustment, density stops varying at a certain point. That is, when a dot diameter of a certain level exceeds a preselected diameter, large dots surrounding a small dot fill up the small dot, depending on a pattern. As a result, image density does not vary even if the diameter of the small dot is increased.

In light of the above, there may be used a method that variably corrects only the tonality of a condition not subjected to correction, and reads a fixed difference between it and a corrected condition out of a correction table. Even this method, however, cannot sufficiently absorb the variation of an image formed by a sophisticated process and ascribable to a difference in the type of a printer and aging.

Further, for a given level represented by identical density output from a densitometer, the output of a scanner often varies due to the scanner characteristic, depending on the tonality processing method.

Moreover, when the user of the printer is not satisfied by the above general tonality correction, tonality correction is executed a plurality of times in accordance with the tonality correcting method. This, however, wastes papers and other supplies, manual operations and cost necessary for tonality correction.

SUMMARY OF THE INVENTION

It is therefore an object of the present invention to provide a printer capable of adequately and simply adjusting tonality in accordance with a desired tonality correcting method and allowing even the user of the printer to adjust the variation of tonality ascribable to a difference in the type of a printer and aging.

A printer of the present invention includes an image reading section for reading an image. An image writing section processes image data input thereto to thereby write an image for forming an image. An image forming section forms an image with any one of a plurality of tonality processing methods that form data written by the image writing section. A test pattern forming section forms a particular test pattern for each of the plurality of tonality processing methods.

The image reading section reads the test pattern formed by the test pattern forming section in accordance with the tonality processing method. Data representative of the test pattern are compared with target data for thereby executing tonality correction matching with the tonality processing method.

BRIEF DESCRIPTION OF THE DRAWINGS

The above and other objects, features and advantages of the present invention will become more apparent from the following detailed description taken with the accompanying drawings in which:

FIG. 6 is a table listing specific target data representative of an alternative embodiment of the present invention;

DESCRIPTION OF THE PREFERRED EMBODIMENTS

Figure 1:
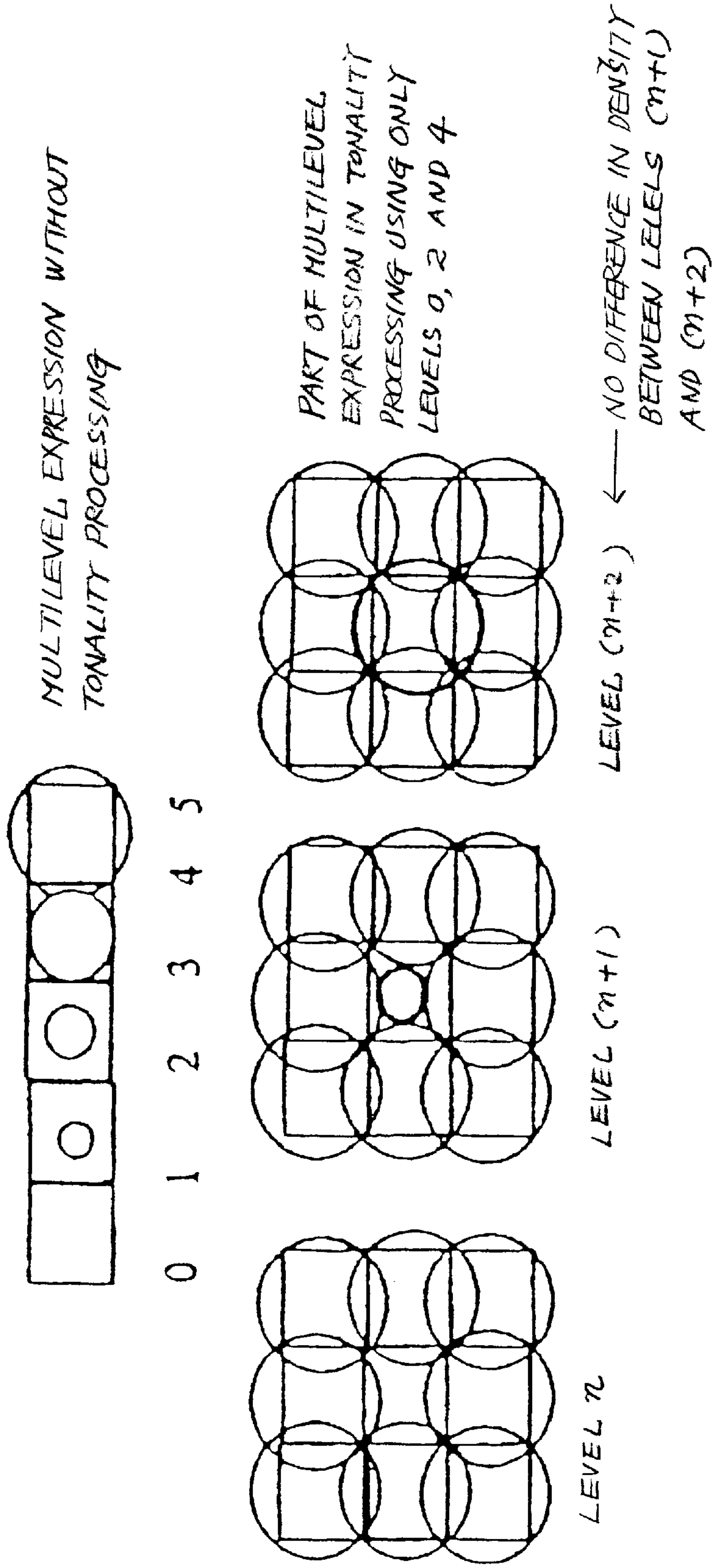
FIG. 1 is a view showing specific dots subjected to conventional tonality correction.

To better understand the present invention, FIG. 1 shows the problem of the conventional tonality correction scheme more specifically. As shown, when a dot diameter of a certain level exceeds a preselected diameter, large dots surrounding a small dot fill up the small dot, depending on a pattern. As a result, image density does not vary even if the diameter of the small dot is increased.

Figure 2:
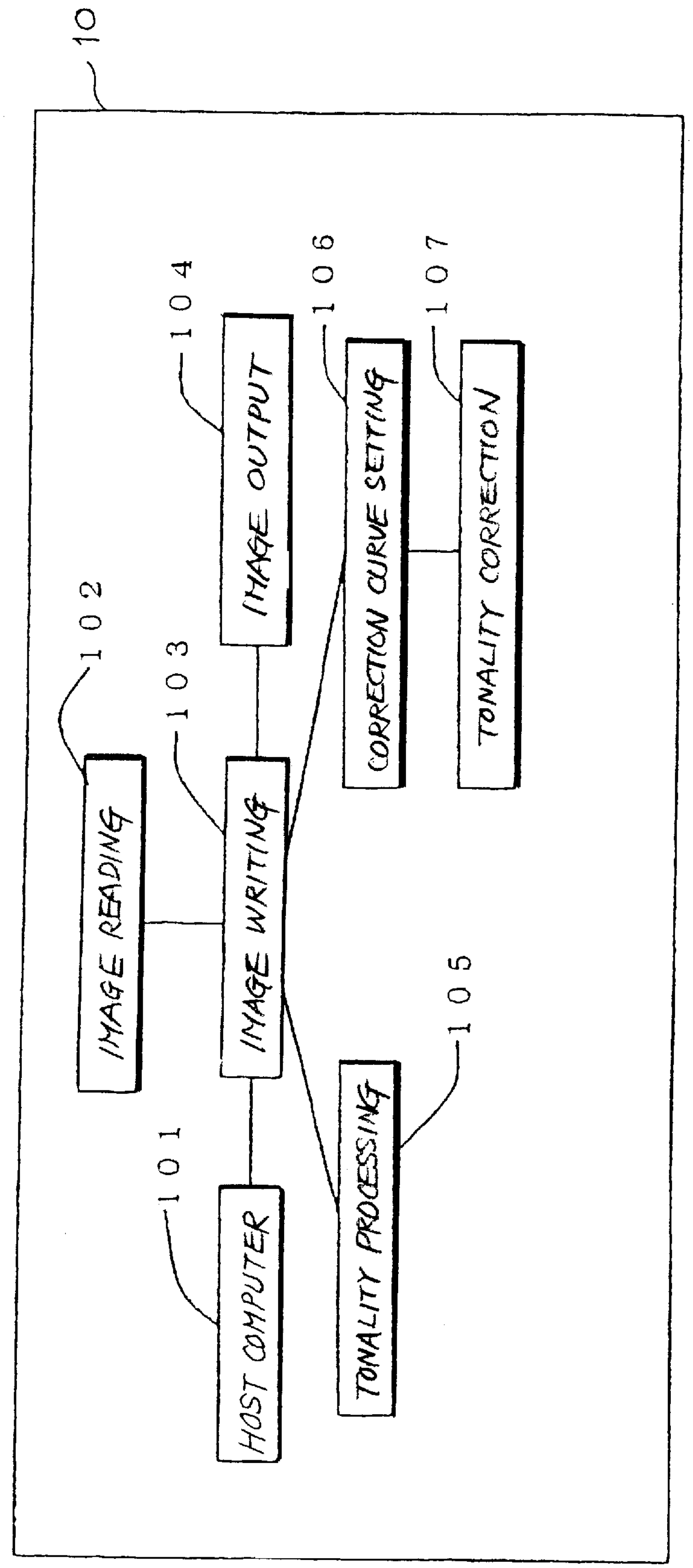
FIG. 2 is a block diagram schematically showing a printer with a tonality correction capability embodying the present invention.

Referring to FIG. 2, a printer embodying the present invention is shown and generally designated by the reference numeral 10. As shown, the printer 10 includes a host computer 101, an image reading apparatus 102, an image writing apparatus 103, an image output apparatus 104, a tonality processing apparatus 105, a correction curve setting apparatus 106, and a tonality correction apparatus 107.

The image reading apparatus 102 reads an image. The image writing apparatus 103 receives data from, e.g., the host computer 101, transforms the data to a format capable of being output, and writes the transformed data to an image buffer memory not shown. The image output apparatus 104 outputs the image written in the image buffer memory. When the image writing apparatus 103 processes the above data, it selects the tonality processing apparatus 105 on the basis of the capacity of image buffer memory and a user's command and references the correction curve setting apparatus 106. The correction curve setting apparatus 106 is set in combination with the tonality processing method of the tonality processing apparatus 105 beforehand. The image output apparatus 104 outputs the data stored in the memory on a paper or similar recording medium.

The printer 10 is characterized in that the tonality correction apparatus 107 updates the correction curve setting apparatus 106 and executes tonality correction in such a manner as to cancel variation ascribable to differences in the type of a printer and aging, as will be described hereinafter.

Figure 3:
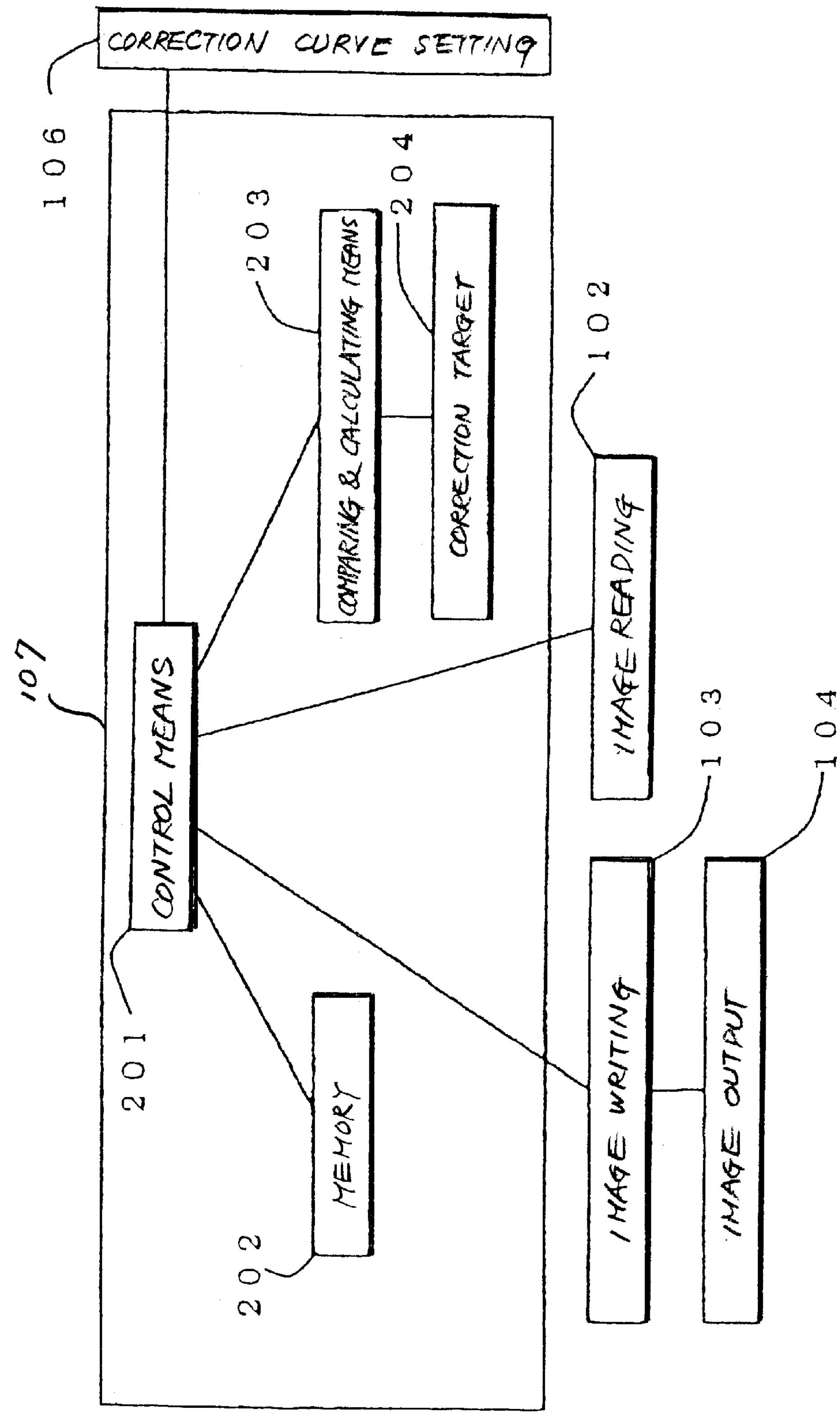
FIG. 3 is a block diagram schematically showing a specific configuration of a tonality correcting section included in the illustrative embodiment.
Figure 4:
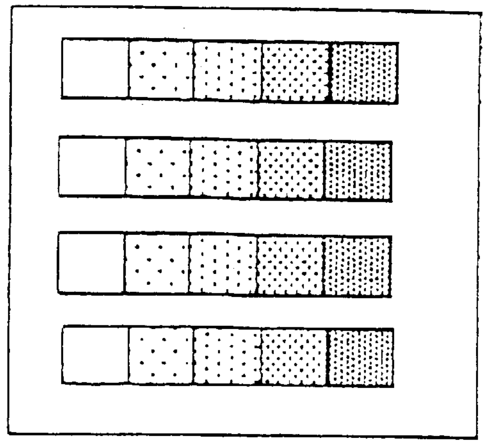
FIG. 4 is a view showing a specific test pattern.

FIG. 3 shows a specific configuration of the tonality correction apparatus 107. In the figures, identical reference numerals designate identical structural elements. As shown, the tonality correction apparatus 107 includes control means 201, a memory 202, comparing and calculating means 203, and correction target 204. FIG. 4 shows a specific test pattern stored in the memory 202.

Figure 5:
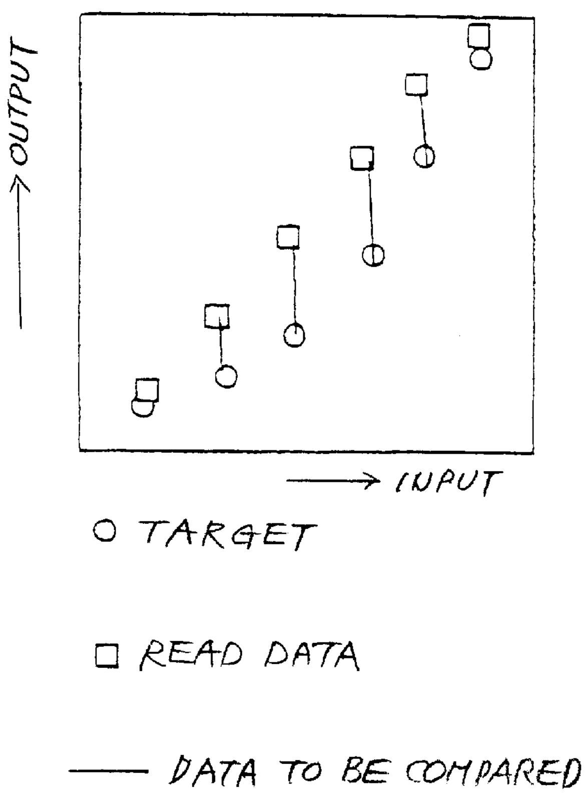
FIG. 5 is a view showing how read data are compared with target data for correction.

In operation, the control means 201 reads the test pattern out of the memory 202 in accordance with a designated tonality processing method and causes the image writing apparatus 103 and image output apparatus 104 to output the test pattern. Subsequently, the image reading apparatus 102 reads the test pattern. The comparing and calculating means 203 compares the data read by the image reading apparatus 102 and data of the correction target 204, as shown in FIG. 5 specifically. The control means 201 then updates the correction curve setting apparatus 106 on the basis of the result of comparison. The test pattern shown in FIG. 4 is only illustrative and may be replaced with any other test pattern so long as it can be representative of the current tonality. Also, comparison and calculation is practicable with any suitable method so long as it can transform the data to a unit allowing the current tonality and target tonality to be compared, and drawing a curve representative of the resulting differences.

An alternative embodiment of the present invention will be described hereinafter. Basically, this embodiment is also practicable with the tonality correction apparatus 107 shown in FIG. 3. In the illustrative embodiment, the control means 201 stores a plurality of groups of target data each being assigned to a particular tonality processing method. FIG. 6 shows a specific table listing such a plurality of groups of target data. The tonality correction apparatus 107 selects a single group of target data in accordance with a designated tonality processing method and thereby implements particular optimal tonality correction method by method.

In another alternative embodiment of the present invention, the correction target 204, FIG. 3, has a particular group of target data for each of cyan (C), magenta (M), yellow (Y) and black (K). C, M and Y target data are selected such that they render gray when superposed by the same amount. Specifically, in the illustrative embodiment, the test pattern shown in FIG. 4 is so configured as to render the characteristics of C, M, Y and K. A particular target data is assigned to each of the colors C, M, Y and K. Further, the contents of the targets assigned to C, M and Y are selected in consideration of gray balance and are therefore adjustable.

Figure 7:
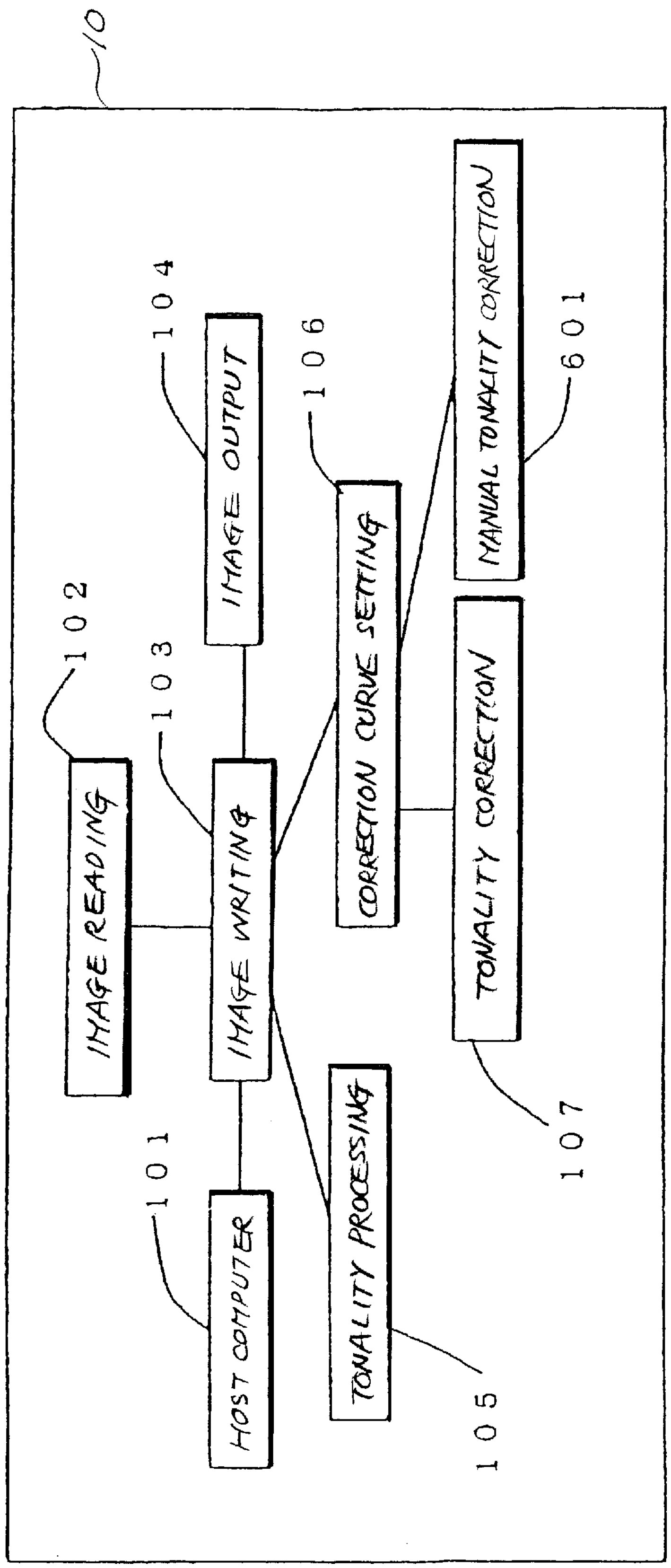
FIG. 7 is a schematic block diagram showing another alternative embodiment of the present invention.

FIG. 7 shows still another alternative embodiment of the present invention. In FIG. 7, structural elements identical with the structural elements shown in FIG. 2 are designated by identical reference numerals and will not be described in order to avoid redundancy. As shown, the illustrative embodiment additionally includes manual tonality correction means 601 allowing the user to adjust tonality by hand. The manual tonality correction means 601 is adapted for special applications and may allow a curve to be manipulated on a host computer or may allow an output to be directly designated in the form of a numerical value in response to an input.

Figure 8:
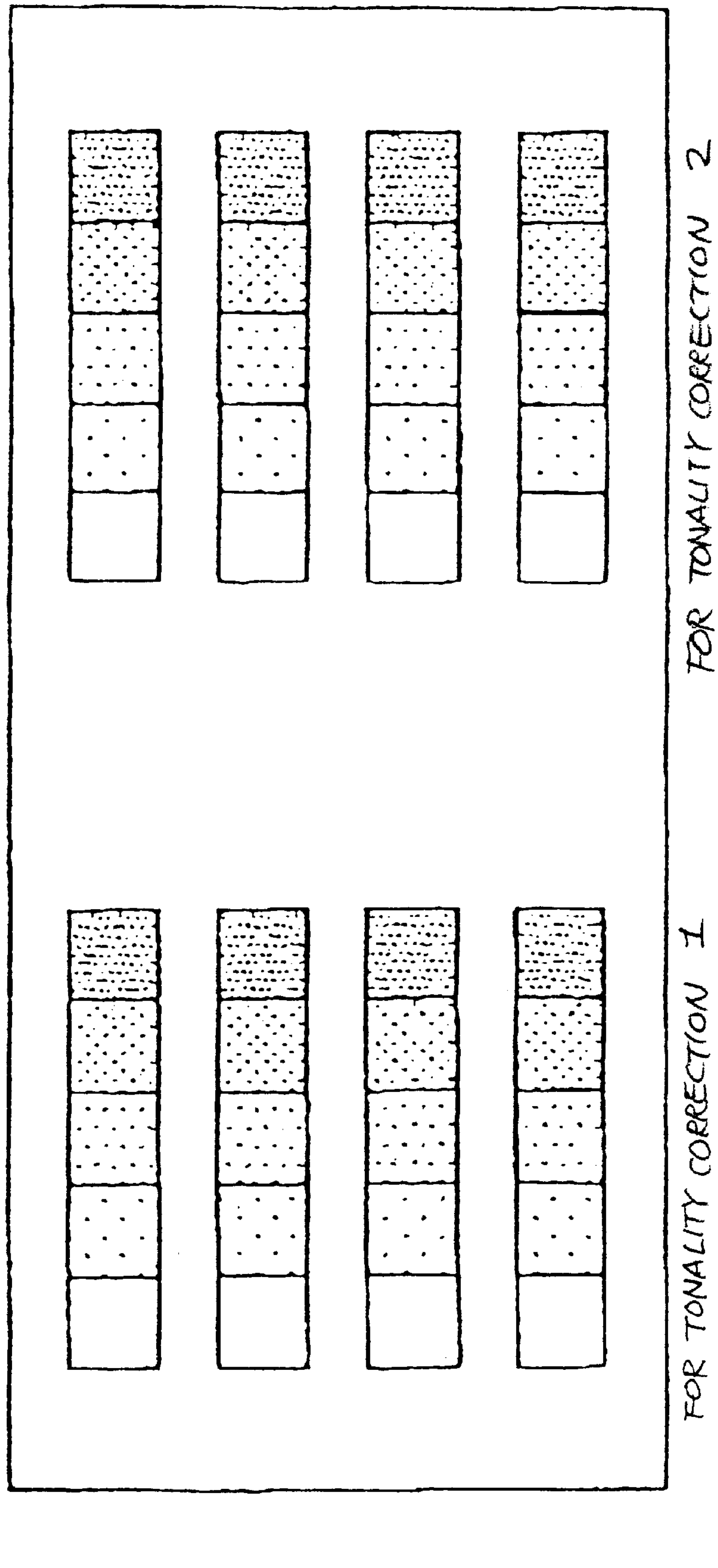
FIG. 8 is a view showing other specific test patterns.

A further alternative embodiment of the present invention integrates test patterns as far as possible for various tonality processing methods. FIG. 8 shows specific test patterns applicable to the illustrative embodiment. Combinations of tonality processing methods are stored in a memory beforehand. The image reading and comparing and calculating steps to follow each are executed by distinguishing the above combinations.

In summary, it will be seen that the present invention provides a printer capable of executing adequate tonality correction matching with a designated tonality correcting method, and absorbing a change in tonality ascribable to a change in the overlapping degree of dots, the degree of fixation and so forth that depend on the type of a printer and aging. Specifically, the printer successfully absorbs the fact that the output value of a scanner depends on the tonality processing method even for a given density level. Further, the printer is capable of faithfully reproducing colors. In addition, the printer allows the user to adjust tonality to the user's taste by hand and saves papers and other supplies for implementing tonality correction as well as manual operation and cost.

Various modifications will become possible for those skilled in the art after receiving the teachings of the present disclosure without departing from the scope thereof.

What is claimed is:

1. A printer comprising:

image reading means for reading an image;

image writing means for processing image data input thereto to thereby write an image for forming an image;

image forming means for forming an image with any one of a plurality of tonality processing methods that form data written by said image writing means; and test pattern forming means for forming a particular test pattern based on a designated tonality processing method of the plurality of tonality processing methods;

wherein said image reading means reads a test pattern formed by said test pattern forming means in accordance with the designated tonality processing method, data representative of said test pattern being compared with target data for thereby executing tonality correction matching with said tonality processing method.

2. A printer as claimed in claim 1, wherein a particular target for tonality correction is assigned to each tonality processing method.

3. A printer as claimed in claim 2, wherein a particular target for tonality correction is assigned to each color.

4. A printer as claimed in claim 1, further comprising manual tonality correcting means for allowing a person to correct tonality by hand.

5. A printer as claimed in claim 1, wherein a plurality of test patterns are integrated for the tonality processing method to be used.

6. A printer comprising:

image reading means for reading an image;

image writing means for processing image data input thereto to thereby write an image for forming an image;

image forming means for forming an image with any one of a plurality of tonality processing methods that form data written by said image writing means; and test pattern forming means for forming a particular test pattern for each of the plurality of tonality processing methods;

wherein said image reading means reads a test pattern formed by said test pattern forming means in accordance with a tonality processing method, data representative of said test pattern being compared with target data for thereby executing tonality correction matching with said tonality processing method;

wherein a particular target for tonality correction is assigned to each tonality processing method.

7. A printer as claimed in claim 6, wherein a particular target for tonality correction is assigned to each color.

8. A printer as claimed in claim 6, further comprising manual tonality correcting means for allowing a person to correct tonality by hand.

9. A printer as claimed in claim 6, wherein a plurality of test patterns are integrated for the tonality processing method to be used.

* * * * *